(12) United States Patent
Otten (10) Patent No.: US 12,337,721 B2
(45) Date of Patent: Jun. 24, 2025

(54) BIDIRECTIONAL CONVERTER FOR A BATTERY MANAGEMENT SYSTEM

(71) Applicant: Atlas Technologies Holding B.V., Helmond (NL)

(72) Inventor: Marald Otten, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 235 days.

(21) Appl. No.: 18/038,728

(22) PCT Filed: Dec. 2, 2021

(86) PCT No.: PCT/EP2021/083928
§ 371 (c)(1),
(2) Date: May 25, 2023

(87) PCT Pub. No.: WO2022/117711
PCT Pub. Date: Jun. 9, 2022

(65) Prior Publication Data
US 2024/0042896 A1  Feb. 8, 2024

(30) Foreign Application Priority Data
Dec. 2, 2020 (NL) ........................... 2027025

(51) Int. Cl.
*H02M 3/335* (2006.01)
*B60L 58/20* (2019.01)
(52) U.S. Cl.
CPC ......... *B60L 58/20* (2019.02); *H02M 3/33584* (2013.01); *B60L 2210/12* (2013.01); *B60L 2210/14* (2013.01); *B60L 2240/547* (2013.01)

(58) Field of Classification Search
CPC .. B60L 58/20; B60L 2210/12; B60L 2210/14; B60L 2210/10; B60L 2240/547; H02M 3/3354
See application file for complete search history.

(56) References Cited

U.S. PATENT DOCUMENTS

2006/0058897 A1* 3/2006 Senda ..................... B60L 58/12
700/286
2006/0232238 A1 10/2006 Horii
(Continued)

FOREIGN PATENT DOCUMENTS

WO        2015033199 A2     3/2015

OTHER PUBLICATIONS

Netherlands Search Report and Written Opinion dated Nov. 9, 2021, for Netherlands Patent Application No. 2027025.
(Continued)

*Primary Examiner* — Sisay G Tiku
(74) *Attorney, Agent, or Firm* — Patterson + Sheridan, LLP (57) ABSTRACT

The invention relates to a battery management system for an electric vehicle comprising a high voltage battery, low voltage battery and a bidirectional converter. The bidirectional converter is configured to connect the high voltage battery to the low voltage battery and to generate a power flow between the high voltage battery and the low voltage battery. The bidirectional converter is further configured to monitor a first voltage associated with the high voltage battery and a second voltage associated with the low voltage battery, and to control a voltage ratio of the first voltage and the second voltage to remain in a predetermined range, by controlling the power flow between the high voltage battery and the low voltage battery.

28 Claims, 6 Drawing Sheets

(56) References Cited

U.S. PATENT DOCUMENTS

| | | | |
|---|---|---|---|
| 2010/0314945 A1 | 12/2010 | Yamazaki et al. | |
| 2012/0143425 A1* | 6/2012 | Yamamoto | B60W 20/10 180/65.265 |
| 2020/0212816 A1* | 7/2020 | Sun | H02J 7/0018 |

OTHER PUBLICATIONS

PCT International Search Report and Written Opinion dated Mar. 21, 2022, for International Application No. PCT/EP2021/083928.

* cited by examiner

BIDIRECTIONAL CONVERTER FOR A BATTERY MANAGEMENT SYSTEM

BACKGROUND

The invention relates to a battery management system of a vehicle, a method controlling a battery management system and a computer-implemented method for controlling a bidirectional converter.

The market of electrical and/or hybrid vehicles (cars, bikes, boats, . . . ) is booming. An example of a hybrid vehicle is a vehicle that requires energy input from at least two different types of energy sources, e.g. an electric power source or electric engine and a fuel power source or combustion engine. The electric power source can for example be a solar power source, which can e.g. be integrated in the vehicle itself, for instance by integrating photovoltaic solar cells into the vehicle. The performance of the vehicle is strongly dependent from the storage capacity of energy, for example batteries. An important factor is the management of the energy storage to enhance efficiency and performance of these systems.

In present systems, electrical and/or hybrid vehicles can include a high voltage energy storage device and a low voltage energy storage device, wherein an energy converter is connected between the high voltage energy storage device and the low voltage energy storage device. The energy converter is configured to transfer energy from one side to the other. For example, when the vehicle is stationary and multiple auxiliaries, e.g. audio, air-conditioning . . . , are consuming power via a low voltage battery, the converter could extract energy from the high voltage source and transfer it to the low voltage battery.

The energy converter in present systems normally has to operate over a wide input voltage range because battery voltages vary significantly with state of charge. However, the wide operating range results in that the converter is not always able to operate in an optimal manner.

SUMMARY OF THE INVENTION

It is an object of the invention to provide a battery management system for a vehicle. The battery management system comprises:
  a high voltage battery,
  a low voltage battery,
  a bidirectional converter configured to connect the high voltage battery to the low voltage battery and to generate a power flow between the high voltage battery and the low voltage battery, the bidirectional converter is further configured to
    monitor a first voltage associated with the high voltage battery and a second voltage associated with the low voltage battery, and
    control a voltage ratio of the first voltage and the second voltage to remain in a predetermined range, by controlling the power flow between the high voltage battery and the low voltage battery,
    generate the power flow from the high voltage battery to the low voltage battery when the voltage ratio becomes higher than the predetermined range,
    generate the power flow from the low voltage battery to the high voltage battery when the voltage ratio becomes lower than the predetermined range.

A battery management system has to operate over a wide input voltage range because battery voltages vary significantly with state of charge. However, the wide operating range results in that a bidirectional converter of the battery management system is not always able to operate at Zero Voltage Switching (ZVS) and Zero Current Switching (ZCS). The bidirectional converter cannot be optimized to one fixed operating point. In present systems, this could be solved by varying the switching frequency to change the voltage gain. However, this process is often complex and not efficient.

By the introduction of the invention, one is able to mitigate the above-mentioned problems by an easier control and enhanced efficiency of the bidirectional converter of the battery management system.

Further, the invention comprises a bidirectional converter for a battery management system, wherein the bidirectional converter comprises a first terminal for connecting to a high voltage battery and a second terminal for connecting to a low voltage battery, wherein the bidirectional converter is configured to connect the high voltage battery to the low voltage battery and to generate a power flow between the high voltage battery and the low voltage battery, the bidirectional converter is further configured to
  monitor a first voltage associated with the high voltage battery and a second voltage associated with the low voltage battery, and
  control a voltage ratio of the first voltage over and the second voltage to remain in a predetermined range, by controlling the power flow between the high voltage battery at the first terminal and the low voltage battery at the second terminal,
  generate the power flow from the high voltage battery to the low voltage battery when the voltage ratio becomes higher than the predetermined range,
  generate the power flow from the low voltage battery to the high voltage battery when the voltage ratio becomes lower than the predetermined range.

The battery management system according to the invention can be applied in an electrical vehicle, for example an electrical vehicle which is at least partly chargeable by an on board solar panel. The on board solar panel may be integrated in the roof of the vehicle. Further, the electrical vehicle may comprise in-wheel motors.

In general, a high voltage battery and a low voltage battery of the battery management system are employed to power one or more electric propulsions motors and devices operating at low voltage, e.g. car audio system, airbags, seat heating etc., respectively. Generally, the high voltage is higher than 60 volts. Typically, the high voltage is defined as a voltage in a range of 300V-430V and with low voltage is meant operating at a safe voltage, typically 12 volts, 24 volts or 48 volts.

The battery management system further comprises a bidirectional converter that is configured to connect the high voltage battery to the low voltage battery and is configured to generate a power flow between the high voltage battery and the low voltage battery and vice versa. By doing so, the high voltage battery can e.g. supply the low voltage battery when the state of charge (SOC) of the low voltage battery becomes low. The SOC is the level of charge of a battery relative to its capacity. The SOC can e.g. be expressed in a percentage.

In an embodiment, the high voltage battery can be configured to be charged by a photovoltaic apparatus. The photovoltaic apparatus may be solar cells grouped in modules and integrated in or mounted to the roof of an electric vehicle.

Further, the bidirectional converter is configured to monitor a first voltage associated with the high voltage battery and a second voltage associated with the low voltage battery. The first and second voltage may e.g. correspond to the voltages at the terminals of the high voltage battery and the low voltage battery respectively. The first voltage and the second voltage are related to the respective state of energy (SoE) of each voltage battery. In general, the bidirectional converter has to operate over a wide input voltage range because battery voltages vary significantly with SoE.

The bidirectional converter according to the invention further controls a voltage ratio of the first voltage over the second voltage to remain in a predetermined range. To remain in the predetermined range, the bidirectional converter controls a power flow between the high voltage battery and the low voltage battery. The most optimal condition to operate the bidirectional converter, is when the voltage ratio is substantially fixed. By introducing the predetermined range, it is avoided that the bidirectional converter is continuously working to control the voltage ratio at a fixed point. To make it more practical, there is some margin for the voltage ratio to vary within the predetermined range. For example, the predetermined range has an upper limit of +10 percent and an lower limit of −10 percent, relative to a nominal or reference voltage ratio. Suppose that the reference or nominal voltage at the high battery side is 200 V and the reference or nominal voltage at the low battery side is 50 V. Hence, the nominal voltage ratio is 4. The predetermined range can then e.g. be specified as ranging from 3.6 to 4.4 (i.e. a range from +10% to −10% relative the nominal voltage ratio).

By introducing the predetermined range, it is avoided that the bidirectional converter has to operate continuously by controlling the voltage ratio, which is not practical and efficient. It can be pointed out, that the predetermined range may be related to the minimum power the bidirectional converter has to deliver. In this way, the bidirectional converter is turned on only when it has to deliver a minimum amount of power, for example between 50-200 Watts, e.g. 100 Watts. There are different possibilities to control the voltage ratio by the bidirectional converter. This will become clear, in the further description.

The bidirectional converter is further configured to generate the power flow from the high voltage battery to the low voltage battery when the voltage ratio becomes higher than the predetermined range. For example, when a stationary vehicle is turned on and using several functional subsystems of the vehicle (a radio system, a climate control system, a light system, etc.), clearly the SOC of the low voltage battery reduces faster compared to the SOC of the high voltage battery. As such, the second voltage may decrease steadily, while the first voltage more or the less stays unaltered. To control the voltage ratio between the high voltage battery and low voltage battery, the bidirectional converter can extract power from the high voltage battery and supply to the low voltage battery.

Similarly, the bidirectional converter can be configured to generate a power flow from the low voltage battery to the high voltage battery when the voltage ratio (i.e. the ratio of the voltage at the high voltage battery over the voltage at the low voltage battery) becomes lower than the predetermined range. This situation could e.g. arise during extreme weather conditions.

An advantage of the invention is that the bidirectional converter is enabled to operate at a substantially fixed voltage gain, or basically at a fixed frequency. This results in that the converter operates more efficiently in ZVS and ZCS over the whole SoE range without the need of complex actions or procedures. Another advantage is that the peak currents will be lower, and thus lower power losses.

Remark that voltage ratio can also be the ratio of the voltage associated with the low voltage battery over the voltage associated with the high voltage battery.

In an embodiment, the battery management system is configured to maintain the voltage ratio to remain substantially constant. Preferably, the voltage ratio is an integer excluding zero, or 1 over an integer e.g. 4 or ¼. Assuming that both batteries have a similar chemistry, the SOC remains similar as well. Choosing an integer as voltage ratio can reduce the inductor cost and leakage.

In an embodiment, the bidirectional converter is an LLC converter or a CCL converter. Both types of converters are resonant converters. Specific about these converters is that the voltage gain is fixed at a resonant frequency regardless of the load variation. The LLC converter uses magnetizing inductance to cause resonance. Advantages of the LLC resonant converter is the narrow frequency variation range over a wide load range. Even ZVS is possible at no load condition. A disadvantage of current LCC converters is the difficult performance optimizing for a wide input voltage range. However, with the present invention this issue can be mitigated.

Besides the LLC converter, the invention is applicable for a CCL converter. This converter operates in a similar manner as the LLC converter, however instead of using magnetizing inductance for resonance, the CCL converter uses a separate parallel inductor for resonance.

In an embodiment, the bidirectional converter is operating at a fixed switching frequency, when the power flow is generated between the low voltage battery and the high voltage battery. Operating at a fixed frequency is basically operating at a fixed voltage gain. The SOC of both batteries is kept similar. The advantage of this embodiment is that the converter is able to operate in ZVS and ZCS efficiently.

In an embodiment, the bidirectional converter comprises a first terminal for connecting to the high voltage battery and a second terminal for connecting to the low voltage battery. As described above, the high voltage battery can be configured to be charged by a photovoltaic apparatus, wherein the high voltage battery is connectable to the photovoltaic apparatus, e.g. an on board solar panel. Alternatively, the low voltage battery is chargeable by the photovoltaic apparatus. Optionally, the photovoltaic apparatus is configured to charge both the high voltage battery and the low voltage battery.

In an embodiment, the bidirectional converter may comprise a control unit, which monitors the voltage ratio, e.g. on a substantially continuous basis. Based on the monitored voltage ratio and predetermined range, the control unit controls the bidirectional converter to generate the required or desired power flow, e.g. as soon as the voltage ratio falls outside the predetermined range. There are different options for the regulation of the bidirectional converter and generation of the power flow.

A first possible option, is that the bidirectional converter generates the power flow only when the voltage ratio falls outside the predetermined range. The bidirectional converter is actually passive or inactive when the voltage ratio stays for example substantially constant or when the voltage ratio remains in the predetermined range. To resume the above example, wherein the (nominal) voltage ratio is 4 and the limits of the predetermined range is 3.6-4.4. At the moment the voltage ratio increases above 4.4, e.g. 4.5, the bidirectional converter generates a power flow from the high voltage side towards the low voltage side until the voltage ratio reaches the upper limit of the predetermined range.

A disadvantage of this regulation, is that the efficiency of the bidirectional converter is not optimal in the situations when one of the battery sources is significantly supplying power. In that case, the voltage ratio goes steadily towards values outside the predetermined range. Consequently, the bidirectional converter is most of the time active.

Another option, is that the bidirectional converter generates the power flow between the high voltage battery and the low voltage battery as soon as the voltage ratio falls outside the predetermined range. The bidirectional converter controls the power flow in such a way, that the voltage ratio is restored to the nominal voltage ratio. In other words, the bidirectional converter does not stop immediately as soon as the voltage ratio returns within the predetermined range and stays active until the nominal voltage ratio is reached.

To resume the above example, wherein the (nominal) voltage ratio is 4 and the limits of the predetermined range is 3.6-4.4. At the moment the voltage ratio increases above 4.4, e.g. 4.5, the bidirectional converter generates a power flow from the high voltage side towards the low voltage side until the voltage ratio reaches nominal voltage ratio of 4. The advantage is that active controlling time of the bidirectional converter is reduced, especially when the voltage ratio systemically increases or decreases.

It can be pointed out, that the transfer of power may be a function of both voltage difference between both batteries and power consumption related to the power supply of the high voltage battery and/or low voltage battery. The rate at which the voltage of a battery decreases is a measure of the power supply of the battery. When the rate of decrease becomes sufficiently high, it is an indication that the battery dominantly supplies power. By monitoring the voltage variation of the high voltage battery and/or low voltage battery in function of time, and thus the power consumption, the battery management system is configured to predict the moment when the voltage ratio could fall outside the predetermined range. The system is configured to anticipate faster on a deviation of the voltage ratio.

A variant on the above regulation of the voltage ratio, is that the bidirectional converter at the moment the voltage ratio is restored to the nominal voltage ratio stays active for a predetermined period by keeping the voltage ratio at the nominal voltage ratio.

To resume the above example, wherein the (nominal) voltage ratio is 4 and the limits of the predetermined range is 3.6-4.4. At the moment the voltage ratio increases above 4.4, e.g. 4.5, the bidirectional converter generates a power flow from the high voltage side towards the low voltage side until the voltage ratio reaches nominal voltage ratio of 4. The bidirectional converter stays active by regulating the power flow between the high voltage battery and the low voltage battery for a predetermined period, e.g. 1 sec, to keep the voltage ratio at 4.

Alternatively, when the voltage ratio falls outside the predetermined range, the bidirectional controls the power flow in such a way, that the voltage ratio is restored to the furthest limit of the predetermined range.

Resuming the above example, wherein the (nominal) voltage ratio is 4 and the limits of the predetermined range is 3.6-4.4. At the moment the voltage ratio increases above 4.4, e.g. 4.5, the bidirectional converter generates a power flow from the high voltage side towards the low voltage side until the voltage ratio reaches the lower limit 3.6 of the predetermined range.

In an embodiment, the bidirectional converter is configured to monitor the first voltage associated with the high voltage battery and the second voltage associated with the low voltage battery by receiving a first voltage signal associated with the first voltage and a second voltage signal associated with the second voltage to control the power flow based on the first voltage signal and the second voltage signal.

In an alternative embodiment, the bidirectional converter may comprise a voltage measurement device. The voltage measurement device may be connected to the first voltage battery and/or the low voltage battery. The voltage measurement device is configured to measure the first voltage and/or the second voltage. Subsequently, the voltage measurement devices supplies a first voltage signal associated with the first voltage and/or a second voltage signal associated with the second voltage to the bidirectional converter.

In accordance with the invention, the invention further pertains to a method of controlling a battery management system for an electric vehicle comprising a high voltage battery, a low voltage battery, a bidirectional converter configured to connect the high voltage battery to the low voltage battery and to generate a power flow between the high voltage battery and the low voltage battery, the method comprising the steps of:

monitoring a first voltage associated with the high voltage battery and a second voltage associated with the low voltage battery, controlling a voltage ratio of the first voltage over the second voltage to remain in a predetermined range, by controlling the power flow between the high voltage battery and the low voltage battery generating the power flow from the high voltage battery to the low voltage battery when the voltage ratio is higher than the predetermined range, generating the power flow from the low voltage battery to the high voltage battery when the voltage ratio is lower than the predetermined range.

In the method according to the invention, a first voltage associated with a high voltage battery and a second voltage associated with a low voltage battery are monitored. The high voltage battery and the low voltage battery are connectable via a bidirectional converter. By monitoring the first voltage and the second voltage, a voltage ratio is determined. For example, both voltages may be determined by a voltage measurement via a control unit. The control unit may be part of the bidirectional converter. Alternatively, there may be a decentralised control unit, which determines the voltages of both batteries, wherein the control unit controls the bidirectional converter.

The next step of the method according to the invention is the control of the voltage ratio of the first voltage over the second voltage to remain in a predetermined range. Thereby, the bidirectional converter controls the power flow between the high voltage battery and the low voltage battery. The power flow is generated from the high voltage battery to the low voltage battery when the voltage ratio is higher than the predetermined range. For example, when a stationary vehicle is turned on and using several functional subsystems of the vehicle (a radio system, a climate control system, a light system, etc.), clearly the SOC of the low voltage battery reduces faster compared to the SOC of the high voltage battery. As such, the second voltage may decrease steadily, while the first voltage more or the less stays unaltered. To control the voltage ratio between the high voltage battery and low voltage battery, power is extracted from the high voltage battery and supplied to the low voltage battery.

Similarly, the power flow is generated from the low voltage battery to the high voltage battery when the voltage ratio becomes lower than the predetermined range. This situation could e.g. arise during extreme weather conditions.

The predetermined range comprises for example an upper limit and lower limit in which the voltage ratio has to be controlled. The following example will clarify this.

Presume that the desired voltage ratio is taken as 4, meaning that the SOC of each battery is equal. For this example, the predetermined range has an upper limit of 4,4 and a lower limit of 3,6. In other words, there is an built-in deviation of 10 percent of the desired voltage ratio. During operation, the bidirectional converter monitors the first voltage and the second voltage. A high load on the high voltage battery causes a higher power demand from the high voltage battery compared to the low voltage battery. The balance between both batteries will be disturbed, and the voltage ratio drops below 4. When the voltage ratio reaches the lower limit of the predetermined range, i.e. 3,6, the bidirectional converter transforms power from the low voltage battery to the high voltage battery. The power flow ensures that the voltage ratio remains in the predetermined range.

The invention will be described in more detail below with reference to the figures, in which in a non-limiting manner exemplary embodiments of the invention will be shown. The same reference numerals in different figures indicate the same characteristics in different figures.

Figure 1:
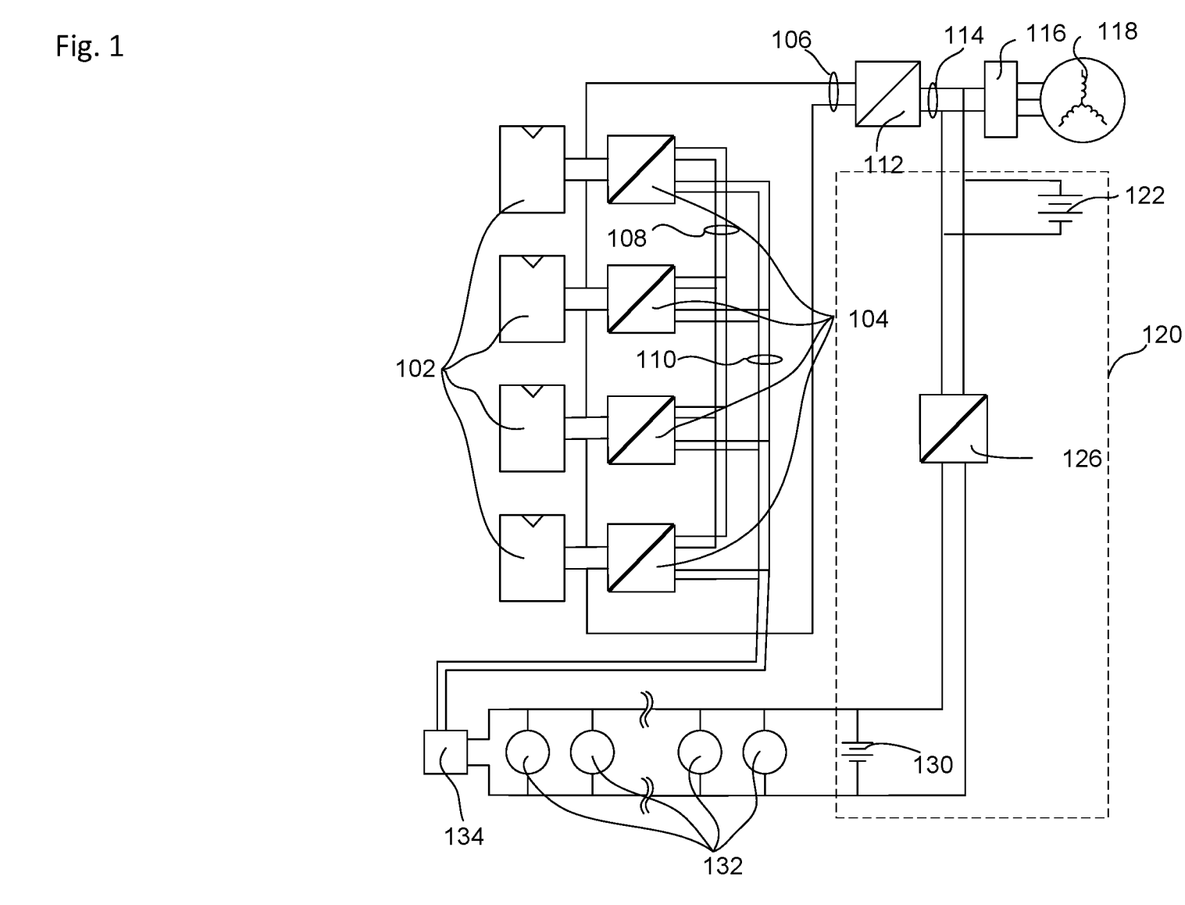
FIG. 1: Schematically illustrates a battery management system according to an embodiment of the invention comprising a high voltage battery, a low voltage battery and a bidirectional converter.

FIG. 1 schematically illustrates an electric schedule of a solar car, wherein a battery management system 120 is shown comprising a high voltage battery 122, a low voltage battery 130 and a bidirectional converter 126. The battery management system 120 is applied in an electrical vehicle which is at least partly chargeable by on board solar panel, comprising solar cells. Typically, the solar cells are integrated in the roof of the electric vehicle.

First, FIG. 1 shows several groups of solar cells 102, each of these groups connected with an associated Distributed Maximum Power Point Tracker 104. Groups 102 are connected in series, thereby forming a string, the output of the string connected to a string voltage bus 106.

One side of each Distributed Maximum Power Point Tracker 104, the primary side, is connected to the group associated with that Distributed Maximum Power Point Tracker. The other side, the secondary side, is connected to the Energy Exchange Bus 108. For diagnostics, and other possible uses, such as monitoring of currents, the Distributed Maximum Power Point Tracker shows a communication bus 110. The string voltage bus 106 is connected via DC/DC converter 112.

A Distributed Maximum Power Point Tracker Controller 134 controls the Distributed Maximum Power Point Trackers 104 via communication bus 110, for example disabling the groups 102 during service or error conditions (for example indicated by activated airbags) etc. DC/DC converter 112 loads the string bus 106.

Also shown is a motor controller 116 connected with the high voltage bus, generating the voltages for the (electric) traction motor 118, for example a permanent magnet motor. It is noted that more than one motor may be used (typically each motor having its own motor controller). It is also noted that the motor may be any type of motor for propelling the vehicle (or boat), brushed or brushless, etc., as long as it is an electric motor.

Remark that most of the above components are optional concerning the invention.

The bidirectional converter 126 connects the high voltage battery 114 with the low voltage battery 128. The bidirectional converter is configured to generate a power flow between the high voltage battery and the low voltage battery. The low voltage battery 130 (typically a lead-acid battery) powers a multitude of low voltage users 132 (airconditioning, audio system, lighting, etc.). Typically, the high voltage is defined as higher than 60 volts. Typically, the high voltage is defined as a voltage in a range of 300V-430V. With low voltage is meant operating at a safe voltage, typically 12 volts or 24 volts.

The bidirectional converter 126 is configured to feed the low voltage battery 130 from the high voltage battery 122, for example when the low voltage battery demands loading, or vice versa. The high voltage battery and/or the low voltage battery are configured to be charged by a the solar cells.

Figure 2:
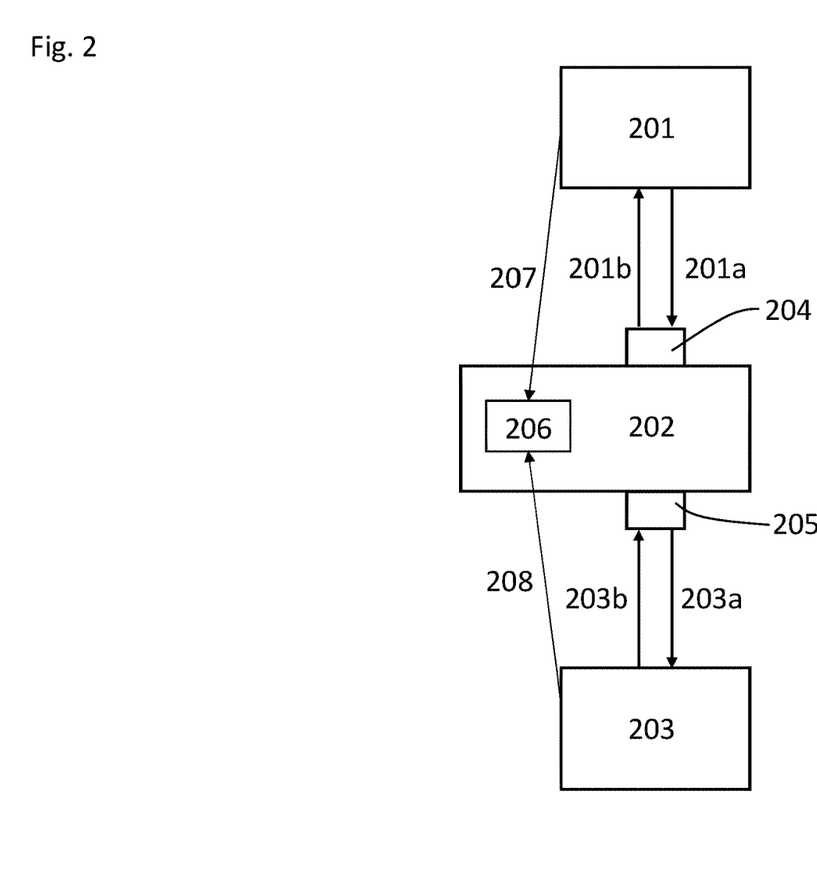
FIG. 2: Schematically illustrates a bidirectional converter for a battery management system, wherein the bidirectional converter comprises a first terminal for connecting to a high voltage battery and a second terminal for connecting to a low voltage battery.

FIG. 2 schematically illustrates a bidirectional converter for a battery management system according to the invention. The bidirectional converter 202 comprises a first terminal 204 for connecting to a high voltage battery 201 and a second terminal 205 for connecting to a low voltage battery 203. The bidirectional converter 202 is configured to connect the high voltage battery 201 to the low voltage battery 203 and to generate a power flow (indicated by the arrows 201a, 201b, 203a, 203b) between the high voltage battery 201 and the low voltage battery 203. The transfer of power from the high voltage battery 201 to the low voltage battery 203 via the bidirectional converter 202, is illustrated by the arrows 201a, 203a. The transfer of power from the low voltage battery 203 to the high voltage battery 201, is illustrated by the arrows 203b, 201b.

The bidirectional converter 202 is configured to monitor a first voltage associated with the high voltage battery 201 at the first terminal 204 and a second voltage associated with the low voltage battery 203 at the second terminal 205. The bidirectional converter receives a first signal 207 corresponding to the first voltage 207 and a second signal 208 corresponding to the second voltage 208. The first and second voltage may e.g. correspond to the voltages at the terminals of the high voltage battery and the low voltage battery respectively. The first voltage and the second voltage are related to the respective SOC of each voltage battery.

The bidirectional converter 202 further controls a voltage ratio of the first voltage over the second voltage to remain in a predetermined range. To remain in the predetermined range, the bidirectional converter controls a power flow between the high voltage battery 201 and the low voltage battery 203. The most optimal condition to operate the bidirectional converter, is when the voltage ratio is substantially fixed. By introducing the predetermined range, it is avoided that the bidirectional converter is continuously working to control the voltage ratio at a fixed point. To make it more practical, there is some margin for the voltage ratio to vary within the predetermined range. By introducing the predetermined range, it is avoided that the bidirectional has to operate continuously by controlling the voltage ratio, which is not practical and efficient.

The bidirectional converter is further configured to generate the power flow from the high voltage battery to the low voltage battery when the voltage ratio becomes higher than the predetermined range. For example, when a stationary vehicle is turned on and using several functional subsystems of the vehicle (a radio system, a climate control system, a light system, etc.), clearly the SOC of the low voltage battery goes faster to zero compared to the SOC of the high voltage battery. The second voltage decreases steadily, while the first voltage more or the less stays unaltered. To control the voltage ratio between the high voltage battery and low voltage battery, the bidirectional converter can extract power from the high voltage battery to the low voltage battery.

In the other way, the bidirectional converter is configured to generate the power flow from the low voltage battery to the high voltage battery when the voltage ratio becomes lower than the predetermined range. This situation could e.g. arise during extreme weather conditions.

In FIG. 2, the bidirectional converter comprises a control unit 206, which constantly monitors the voltage ratio. The control unit 206 receives a first signal 207 representing the first voltage and a second signal 208 representing the second voltage to determine the voltage ratio. Based on the monitored voltage ratio and predetermined range, the control unit 206 controls the bidirectional converter 202 to generate the required power flow, e.g. as soon as the voltage ratio falls outside the predetermined range. There are different options for the regulation of the bidirectional converter 202 and generation of the power flow. In an embodiment, the control unit may also be a separate controller or control unit, i.e. a controller or control unit separate from the bidirectional converter. Such a separate control unit can e.g. be a central master control unit of the vehicle, which controls the bidirectional converter.

An advantage of the invention is that the converter is enabled to operate at a fixed voltage gain, or basically at a fixed frequency. This results in that the converter operates more efficiently in ZVS and ZCS without the need of complex actions or procedures. Another advantage is that the peak currents will be lower, and thus lower power losses.

Figure 2A:
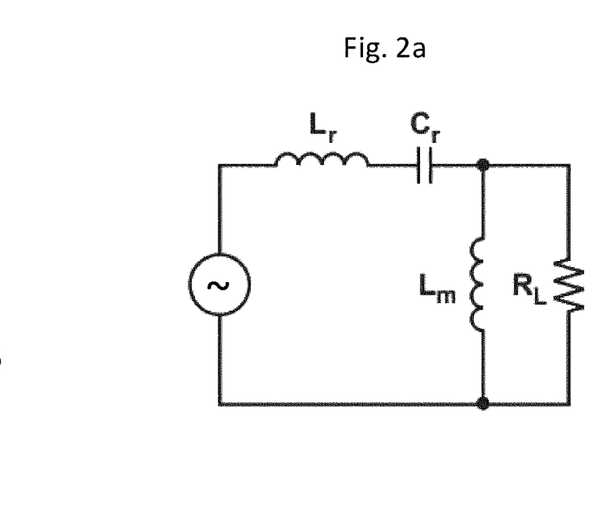
FIG. 2a: Schematically illustrates an embodiment of the bidirectional converter, wherein the bidirectional converter has an LLC configuration.

FIG. 2a shows an embodiment of a bidirectional converter, which is called an LLC resonant converter. Specific about these converters is that the voltage gain is fixed at a resonant frequency regardless of the load variation. The LLC converter uses magnetizing inductance to cause resonance. Advantages of the LLC resonant converter is the narrow frequency variation range over a wide load range. Even ZVS is possible at no load condition. Another possible configuration is the CCL resonant converter, which is quite similar as the LLC resonant converter.

Figure 3A:
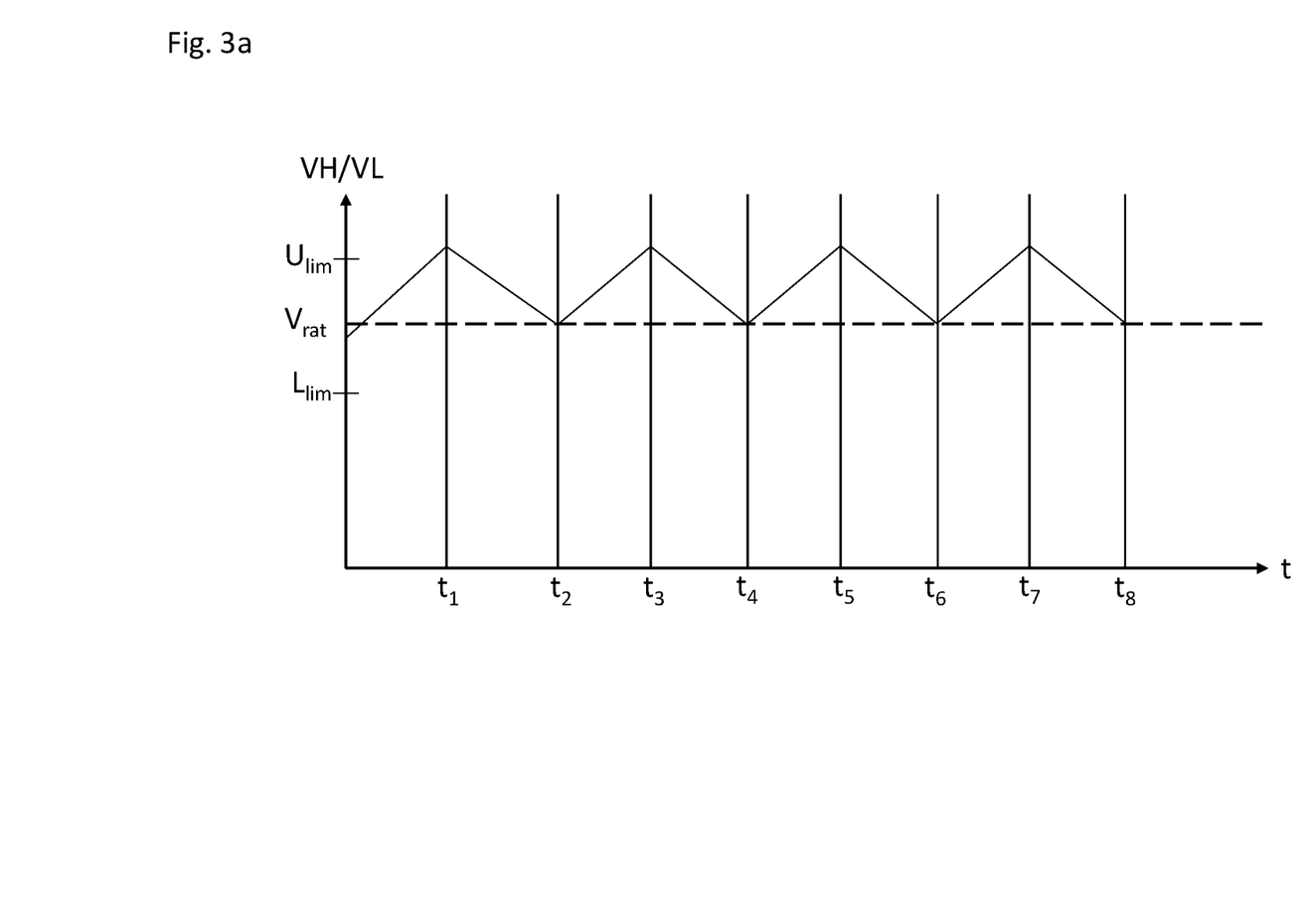
FIGS. 3a-3c: Schematically illustrates different control schemes of controlling a voltage ratio of the first voltage and the second voltage to remain in a predetermined range, by controlling the power flow between the high voltage battery and the low voltage battery.
Figure 3B:
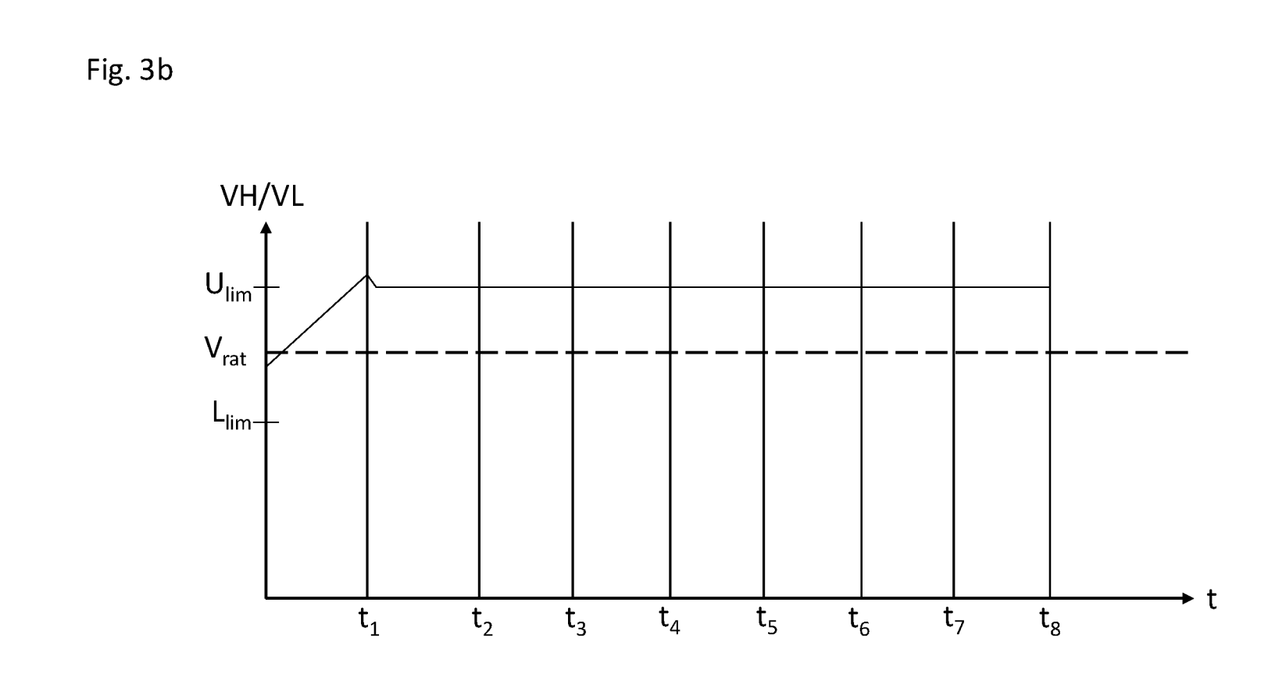
Figure 3C:
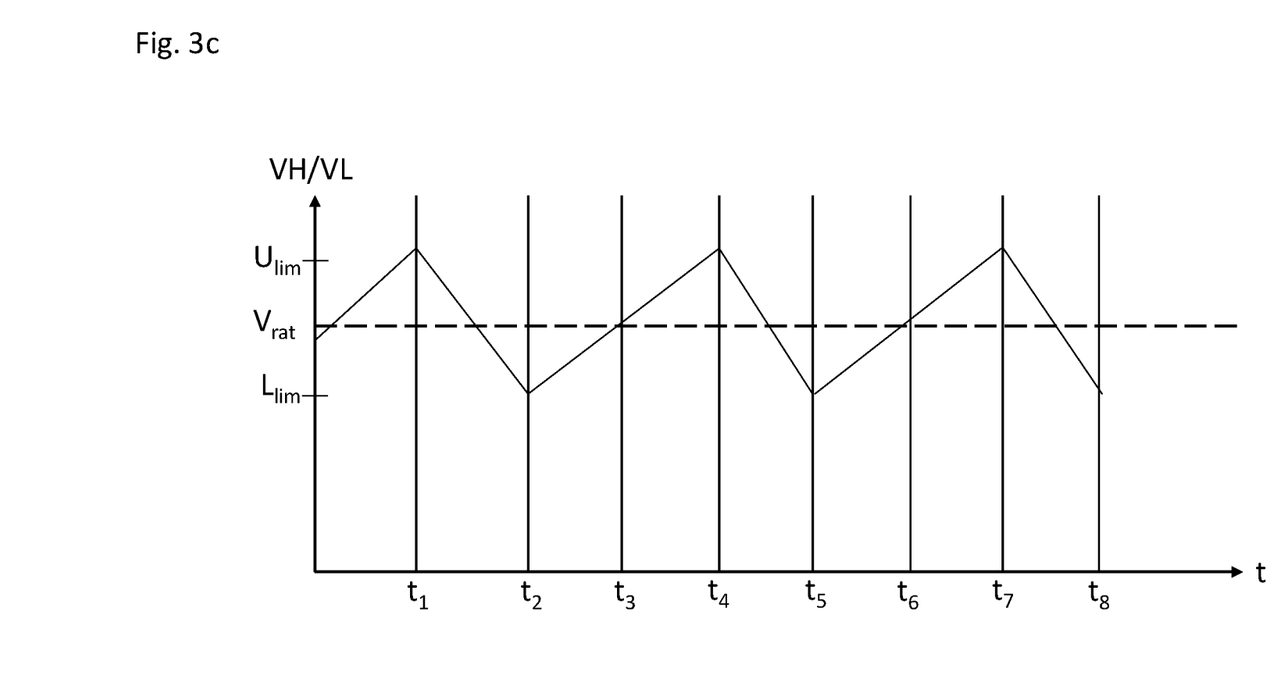

FIGS. 3a-3c schematically illustrate different control schemes of a voltage ratio of the first voltage and the second voltage to remain in a predetermined range, by controlling the power flow between the high voltage battery and the low voltage battery. The ratio of the first voltage VH over the second voltage VL is set out in function of time t.

The bidirectional converter according to the invention is configured to monitor a first voltage associated with the high voltage battery VH and a second voltage associated with the low voltage battery VL. The first and second voltage may e.g. correspond to the voltages at the terminals of the high voltage battery and the low voltage battery respectively.

The bidirectional converter controls a voltage ratio Vrat of the first voltage VH over the second voltage VL to remain in a predetermined range. The predetermined range is specified by an upper limit Ulim and a lower limit Llim. The voltage ratio Vrat and the predetermined range are set out on the vertical axis of FIGS. 3a-3c.

In FIGS. 3a-3c, the predetermined range is defined symmetrically with respect to the voltage ratio, meaning that the voltage ratio is the center of the predetermined range. As an example, the nominal value of the first voltage VH at the high battery side can e.g. be 200 V and the nominal value of the second voltage VL at the low battery side can e.g. be 50 V. Hence, the nominal or desired voltage ratio Vrat is set at 4. The predetermined range has an upper limit of +10 percent and an lower limit of −10 percent, determined from the voltage ratio. The upper limit Ulim is therefore specified at 4.4 and the lower limit Llim at 3.6. By introducing the predetermined range, it is avoided that the bidirectional has to operate continuously by controlling the voltage ratio, which is not practical and efficient.

The bidirectional converter monitors the voltage ratio VH/VL. As soon as the voltage ratio falls outside the predetermined range, the bidirectional converter generates a power flow between the high voltage battery and the low voltage battery. In FIG. 3a, the voltage ratio is assumed to increase and reaches the upper limit at time t1. Consequently, the bidirectional converter starts to generate a power flow from the high voltage side towards the low voltage side until, at time t2, the voltage ratio VH/VL reaches the voltage ratio Vrat of 4. During the period t1-t2, the low voltage battery is thus receiving power from the high voltage battery. In the example given in FIG. 3a, the bidirectional converter stops the power flow once the voltage ratio Vrat is at its nominal value.

As such, in FIG. 3a, the active control periods of the bidirectional converter are during the time intervals t1-t2, t3-t4, t5-t6 and t7-t8. The advantage to generating a power flow only during specific time intervals, is that active controlling time of the bidirectional converter is reduced, especially when the voltage ratio systemically increases or decreases.

Another option, is that the bidirectional converter generates the power flow only when the voltage ratio falls outside the predetermined range. This manner of regulation is visualised in FIG. 3b. The bidirectional converter is actually passive or inactive when the voltage ratio stays for example substantially constant or when the voltage ratio remains in the predetermined range. To resume the example of FIG. 3a, wherein the (nominal) voltage ratio Vrat is 4 and the limits of the predetermined range Llim, Ulim is 3.6-4.4. At time t1 the voltage ratio increases above 4.4, e.g. 4.5, meaning that the low voltage battery dominantly supplies power compared to the high voltage side. As a consequence, the bidirectional converter generates a power flow from the high voltage side towards the low voltage side until the voltage ratio reaches the upper limit Ulim of the predetermined range. In FIG. 3b, it is supposed that during the time interval t1-t8, the low voltage battery continuously uses power, as such that the second voltage associated with the low voltage battery decreases steadily, while the first voltage associated with the high voltage battery more or the less stays unaltered. The bidirectional converters keeps transferring power from the high voltage battery to the low voltage battery to remain at the upper limit Ulim of the predetermined range. A disadvantage of this regulation, is that the efficiency of the bidirectional converter is not optimal in the situations wherein one of the battery sources is significantly supplying power. Consequently, the bidirectional converter is most of the time active. The active control period of the bidirectional converter is during the time interval t1-t8. The regulation of FIG. 3b compared to the situation of FIG. 3a is less efficient.

Alternatively, when the voltage ratio falls outside the predetermined range, the bidirectional controls the power flow in such a way, that the voltage ratio is restored to the furthest limit of the predetermined range. This control scheme is visualised in FIG. 3c.

Resuming the example of FIGS. 3a-3b, wherein the (nominal) voltage ratio Vrat is 4 and the limits of the predetermined range Llim, Ulim is 3.6-4.4. In FIG. 3c, at time t1 the voltage ratio increases above 4.4, e.g. 4.5, the bidirectional converter generates a power flow from the high voltage side towards the low voltage side until the voltage ratio reaches the lower limit Llim 3.6 of the predetermined range.

As can be seen from FIG. 3c, the active control periods of the bidirectional converter are during the time intervals t1-t2, t4-t5 and t7-t8. During these intervals, the bidirectional converter controls a power flow from the high voltage battery to the low voltage battery until the voltage ratio reaches the lower limit Llim. This type of regulation is very efficient in the situations wherein only one of the battery sources is significantly supplying power and wherein the voltage associated with the other battery source more or the less stays unaltered, for example when the battery source isn't supplying power or is charged, e.g. by solar power.

Alternatively, the transfer of power may be a function of both the monitored voltages associated with the batteries and operational data. The operational data is related to all different kind of data, for example the power consumption related to the power supply of the high voltage battery and/or low voltage battery, the use of the vehicle, GPS data etc. For example, the power consumption is a measure of the rate at which the voltage of a battery decreases. When the rate of decrease becomes sufficiently high, it is an indication that the battery dominantly supplies power. By monitoring the voltage variation of the high voltage battery and/or low voltage battery in function of time, and thus the power consumption, the battery management system is configured to predict the moment when the voltage ratio could fall outside the predetermined range. The system is configured to anticipate faster on a deviation of the voltage ratio.

In an embodiment, the vehicle or controller keeps a log of the operational data. Based on the operational data, the system is configured to select the most efficient control mechanism of the bidirectional converter. The system is configured to anticipate more accurately and faster on a deviation of the voltage ratio.

Figure 4:
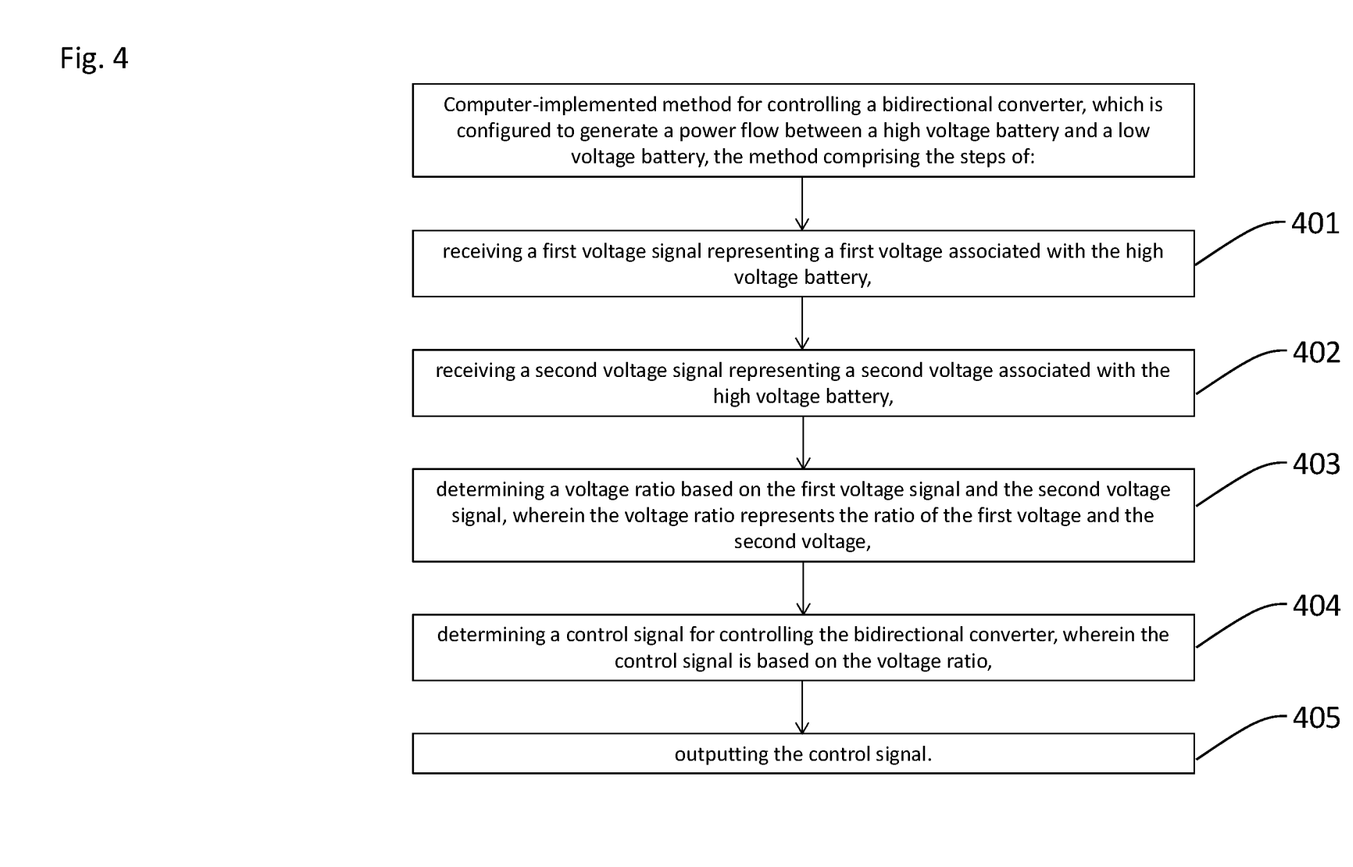
FIG. 4: Schematically depicts an embodiment of a flow diagram of a computer-implemented method for controlling a bidirectional converter according to the invention.

FIG. 4 schematically depicts a flow diagram of an embodiment of the computer-implemented method according to the invention for controlling a bidirectional converter. The bidirectional is configured to generate a power flow between a high voltage battery and a low voltage battery. The bidirectional converter is further configured to connect the high voltage battery to the low voltage battery.

The computer-implemented method according to the invention comprises a step 401 of receiving a first voltage signal representing a first voltage associated with the high voltage battery.

In a step 402, a second voltage signal representing a second voltage associated with the low voltage battery is received. Notice, that the sequence of steps 401, 402 wherein they occur may be changeable, and thus are not fixed. Both steps 401, 402 may be executed at the same time.

The first voltage signal and the second voltage signal can e.g. be derived from the first voltage and the second voltage by monitoring said voltages using a voltage measurement system or device. Such a voltage measurement or monitoring can e.g. be performed by a voltage measurement device associated with the bidirectional converter. The voltage measurement device can e.g. have an output or output terminal at which a signal representing the measured voltage can be made available. In an embodiment, the bidirectional converter can comprise a control unit that is configured to control the voltage measurement device. In an embodiment, a voltage measurement device is configured to measure the first voltage and/or the second voltage. The voltage measurement device may generate a first voltage signal associated with the first voltage and/or a second voltage signal associated with the second voltage.

The computer-implemented method further comprises a determining step 403 of a voltage ratio, which is based on the first voltage signal and the second voltage signal. The voltage ratio represents the ratio of the first voltage and the second voltage.

The computer-implemented method further comprises a step 404 of determining a control signal for controlling the bidirectional converter. The control signal is based on the voltage ratio. In an embodiment, the control signal is configured to control an operation of the bidirectional converter such that the voltage ratio is controlled towards a desired value or is maintained within a predetermined range.

The computer implemented method according to the invention further comprises, in the step 405, that the control signal is outputted. The control signal may be outputted directly to the bidirectional converter. For example, the control signal can ensure that the bidirectional converter generates the required or desired power flow between the high voltage battery and the low voltage battery when the voltage ratio is deviating from its nominal or desired value.

It is to be understood that the disclosed embodiment of FIG. 4 also can be implemented in a method of controlling a battery management system according to the invention. Such a battery management system can e.g. be used in a vehicle and can comprise a high voltage battery, a low voltage battery, and a bidirectional converter configured to connect the high voltage battery to the low voltage battery and to generate a power flow between the high voltage battery and the low voltage battery. Such a battery management system can e.g. further comprise a control unit for controlling the bidirectional converter. Such a control unit can e.g. have one or more input terminals, e.g. to receive the voltage signals of steps 401 and 402 indicated in FIG. 4, and one or more output terminals, e.g. to output the control signal as determined in step 404. Such a control unit may further be configured to execute the computer implemented method according to the invention. In such embodiment, the control unit can e.g. comprise a memory unit and a processing unit. In such embodiment, the memory unit can e.g. be configured to store the received voltage signals and optionally, to store any further operating data that is received. The processing unit of such a control unit can e.g. be configured to process the data that is stored, e.g. the voltage signals, and determine, based on the voltage signals, the voltage ratio and the control signal that is to be outputted to control the bidirectional converter.

It must be understood that the disclosed embodiments serve as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A battery management system for an electric vehicle comprising:
   a high voltage battery,
   a low voltage battery,
   a bidirectional converter configured to connect the high voltage battery to the low voltage battery and to generate a power flow between the high voltage battery and the low voltage battery, the bidirectional converter is further configured to:
      monitor a first voltage associated with the high voltage battery and a second voltage associated with the low voltage battery, and
      control a voltage ratio of the first voltage and the second voltage to remain in a predetermined range, by controlling the power flow between the high voltage battery and the low voltage battery,
      generate the power flow from the high voltage battery to the low voltage battery when the voltage ratio becomes higher than the predetermined range,
      generate the power flow from the low voltage battery to the high voltage battery when the voltage ratio becomes lower than the predetermined range.

2. The battery management system according to claim 1, wherein the voltage ratio is the first voltage divided by the second voltage.

3. The battery management system according to claim 1, wherein the voltage ratio is the second voltage divided by the first voltage.

4. The battery management system according to claim 1, wherein the voltage ratio is substantially constant.

5. The battery management system according to claim 1, wherein the voltage ratio is an integer excluding zero.

6. The battery management system according to claim 1, wherein the predetermined range is between 5-15 percent of the voltage ratio.

7. The battery management system according to claim 1, wherein a photovoltaic apparatus is integrated in a roof of the electric vehicle.

8. The battery management system according to claim 1, wherein the low voltage battery operates in range of 12-48 volts, and the high voltage battery operates above 60 volts.

9. The battery management system according to claim 1, wherein the bidirectional converter is operating in ZVS and/or ZCS.

10. The battery management system according to claim 1, wherein the bidirectional converter is an LLC converter or a CCL converter.

11. The battery management system according to claim 1, wherein the bidirectional converter is operating at a fixed switching frequency, when the power flow is generated between the low voltage battery and the high voltage battery.

12. The battery management system according to claim 1, wherein the bidirectional converter comprises:
   a first terminal for connecting to the high voltage battery,
   a second terminal for connecting to the low voltage battery.

13. A vehicle comprising the battery management system according to claim 1.

14. The vehicle according to claim 13, the vehicle further comprising a solar panel and in-wheel motors.

15. A bidirectional converter for a battery management system, wherein the bidirectional converter comprises a first terminal for connecting to a high voltage battery and a second terminal for connecting to a low voltage battery, wherein the bidirectional converter is configured to connect the high voltage battery to the low voltage battery and to generate a power flow between the high voltage battery and the low voltage battery, the bidirectional converter is further configured to:
   monitor a first voltage associated with the high voltage battery and a second voltage associated with the low voltage battery, and
   control a voltage ratio of the first voltage and the second voltage to remain in a predetermined range, by controlling the power flow between the high voltage battery at the first terminal and the low voltage battery at the second terminal,
   generate the power flow from the high voltage battery to the low voltage battery when the voltage ratio becomes higher than the predetermined range,
   generate the power flow from the low voltage battery to the high voltage battery when the voltage ratio becomes lower than the predetermined range.

16. The bidirectional converter according to claim 15, wherein the bidirectional converter is configured to monitor the first voltage associated with the high voltage battery and the second voltage associated with the low voltage battery by receiving a first voltage signal associated with the first voltage and a second voltage signal associated with the second voltage to control the power flow based on the first voltage signal and the second voltage signal.

17. The bidirectional converter according to claim 16, wherein the bidirectional converter comprises a voltage measurement device, wherein the voltage measurement device is configured to measure the first voltage and/or the second voltage and supply a first voltage signal associated with the first voltage and/or a second voltage signal associated with the second voltage to the bidirectional converter.

18. A method of controlling a battery management system for an electric vehicle comprising a high voltage battery, a low voltage battery, a bidirectional converter configured to connect the high voltage battery to the low voltage battery and to generate a power flow between the high voltage battery and the low voltage battery, the method comprising:
   monitoring a first voltage associated with the high voltage battery and a second voltage associated with the low voltage battery, controlling a voltage ratio of the first voltage and the second voltage to remain in a predetermined range, by controlling the power flow between the high voltage battery and the low voltage battery, generating the power flow from the high voltage battery to the low voltage battery when the voltage ratio is higher than the predetermined range, generating the power flow from the low voltage battery to the high voltage battery when the voltage ratio is lower than the predetermined range.

19. The method according to claim 18, wherein the low voltage battery operates in range of 12-48 volts, and the high voltage battery operates above 60 volts.

20. The method according to claim 18, wherein the step of monitoring comprises providing a voltage ratio signal to the bidirectional converter based on the first voltage and the second voltage.

21. The method according to claim 18, wherein the first voltage and the second voltage are determined by a voltage measurement.

22. The method according to claim 18, wherein the voltage ratio is substantially constant.

23. The method according to claim 18, wherein the voltage ratio is an integer excluding zero.

24. The method according to claim 18, wherein the predetermined range is between 5-15 percent of the voltage ratio.

25. A computer-implemented method for controlling a bidirectional converter, which is configured to generate a power flow between a high voltage battery and a low voltage battery, the method comprising:
receiving a first voltage signal representing a first voltage associated with the high voltage battery,
receiving a second voltage signal representing a second voltage associated with the high voltage battery,
determining a voltage ratio based on the first voltage signal and the second voltage signal, wherein the voltage ratio represents the ratio of the first voltage and the second voltage,
determining a control signal for controlling the bidirectional converter, wherein the control signal is based on the voltage ratio,
outputting the control signal.

26. The method according to claim 25, wherein the control signal is configured to control the power flow of the bidirectional converter, to maintain the voltage ratio of the first voltage and the second voltage in a predetermined range.

27. A computer program comprising instructions which, when the program is executed by a computer, cause the computer to carry out the method of claim 25.

28. A controller for a bidirectional converter, the controller configured to carry out the method of claim 25.

* * * * *